Feb. 12, 1935.   R. E. MILLICAN   1,990,874
HYDRAULIC CLUTCH
Filed March 27, 1933   6 Sheets-Sheet 1

Fig. 1
Fig. 5

Inventor
Roy E. Millican
Jack A. Schley
Attorney

Feb. 12, 1935.  R. E. MILLICAN  1,990,874
HYDRAULIC CLUTCH
Filed March 27, 1933    6 Sheets-Sheet 4

Inventor
Roy E. Millican
By Jack A. Ashley
Attorney

Patented Feb. 12, 1935

1,990,874

UNITED STATES PATENT OFFICE 1,990,874

HYDRAULIC CLUTCH

Roy E. Millican, Dallas, Tex., assignor to L. R. Munger, trustee, Dallas County, Texas Application March 27, 1933, Serial No. 662,972

31 Claims. (Cl. 192—58)

This invention relates to new and useful improvements in hydraulic clutches.

One object of the invention is to provide an improved hydraulic clutch of the over-running type.

A particular object of the invention is to provide a hydraulic clutch which acts automatically to set up a hydraulic clutching action when the driving member of the clutch is revolved in one direction and to automatically unclutch and run free when the speed of the driven member of the clutch exceeds that of the driving member, such clutch involving an improved arrangement of elements for accomplishing these results.

A further object of the invention is to provide valves, automatically actuated by the hydraulic fluid, for controlling the flow of such fluid when motion is imparted to the clutch to drive it for pulling the load, and when the driven elements overrun the driving elements.

Another object of the invention is to provide means for locking the elements in clutched relation, while under hydraulic clutching actuation, whereby the over-running action is prevented.

Still another object of the invention is to provide a hydraulic clutch in which the clutching action will be established by trapping the hydraulic fluid and will depend upon the interposition of the said fluid between moving elements for contributing motion, rather than upon the engagement of metal parts; thereby producing a more flexible and a softer operation.

A further object of the invention is to provide a revoluble housing surrounding a revoluble head or rotor, and a floating eccentric bushing interposed therebetween in a hydraulic chamber, and controlled by the hydraulic fluid so as to be automatically moved into an eccentric position with respect to the rotor to establish clutching; and to be automatically moved into substantially concentric position with respect to said rotor to set up over-running or unclutching.

A construction designed to carry out the invention will be hereinafter described, together with other features of the invention.

The invention will be more readily understood from a reading of the following specification and by reference to the accompanying drawings in which an example of the invention is shown, and wherein:

In the drawings the numeral 15 (Figures 1 and 2) designates a power or drive shaft and 16 a driven or transmitting shaft. The drive shaft may be attached in any suitable manner to the source from which power is received and is shown merely as a power applying element. The driven shaft may, of course, be attached in any desired manner to the part which it is desired to drive. As will be obvious from the following description, the clutch may be driven either from the drive shaft or from the driven shaft and is, therefore, reversible. In the following specification, it will be assumed that the clutch is operated with power supplied to the shaft 15.

A clutch housing 14 comprising side plates 17 and 18 and a ring 19 is rigidly connected with the drive shaft so as to be revolved thereby. The plates are fastened on each side of the ring by through bolts 20. The plate 17 has an outwardly directed cylindrical cap 21 and a reduced cylindrical hub 22 both concentric to the shaft 15 to which the hub is rigidly attached. The outer peripheries of the plates and the ring are concentric to both shafts. The plate 18 has a cylindrical cap 23 and a reduced cylindrical hub 24. Any suitable driving connection may be made with the hub 22, and I have shown the shaft 15 fastened in a tubular shank 22' extending from said hub.

The caps 21 and 23 form a cylindrical chamber or cavity 25 in the housing 14 and a circular rotor 26 (Figures 1 and 3) is mounted to revolve in this chamber. The rotor comprises a cylindrical solid head 27 fastened concentrically between a pair of circular disks or plates 28 by through bolts 29. The disks extend radially beyond the head and form flanges therefor. These disks have a turning fit in the caps 21 and 23 and their inner sides are substantially flush with the inner sides of the plates 17 and 18, whereby an annular fluid chamber 30 is formed between the head and the housing ring 19. A floating or oscillating ring bushing 31 is mounted in this chamber.

Figures 1, 5:
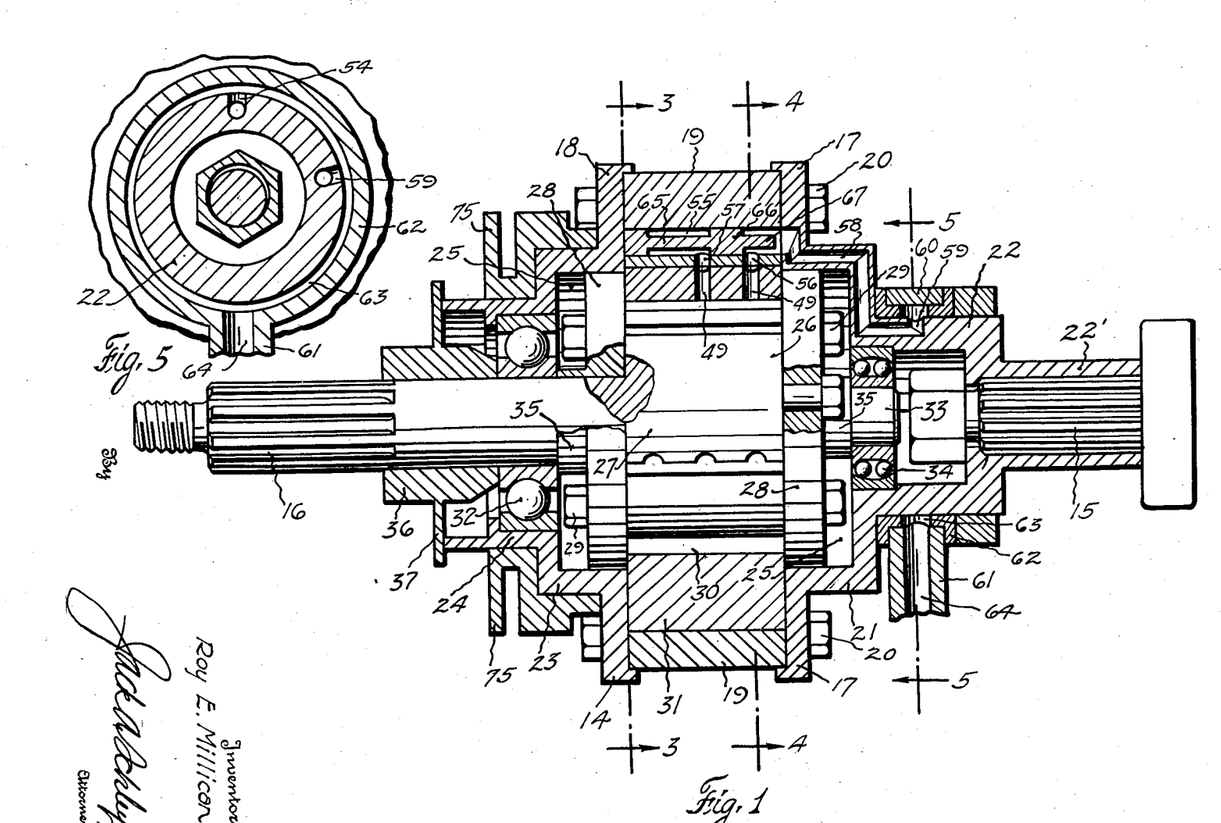
Figure 1 is a longitudinal sectional view of a clutch taken on the line 1—1 of Figure 3, and constructed in accordance with the invention, the parts being in clutched position.
Figure 5 is a transverse sectional view taken on the line 5—5 of Figure 1.

The head 27 of the rotor is rigidly attached to the driven shaft 16 which extends axially therefrom through one of the disks 28, as is shown in Figure 1. The shaft 16 is journaled in a ball bearing 32 seated in the hub 24 and the head has a trunnion 33 journaled in a ball bearing 34 countersunk in the hub 22. The disks 17 and 18 have collars 35 engaging the inner races of the bearings, whereby the end thrust is taken up. By this mounting the housing 14 and the rotor are freely revoluble and the housing is revoluble around the rotor 26. The shaft 16 has a thrust collar 36 thereon projecting into the hub and engaging the inner race of the bearing 32. This collar has a radial flange 37 sealing and projecting beyond the hub. The rotor 26 may revolve in an oil bath in the chamber 25, which bath will also lubricate the bearings 32 and 34.

Figure 3:
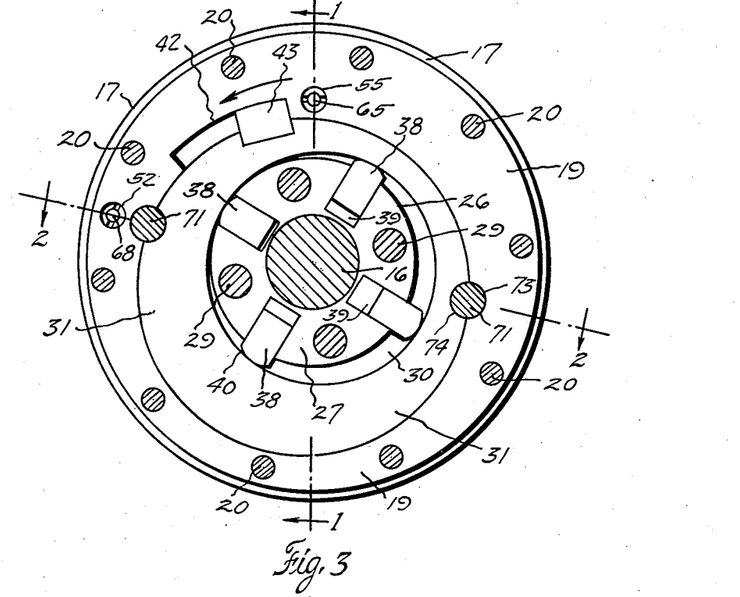
Figure 3 is a transverse sectional view taken on the line 3—3 of Figure 1.
Figure 4:
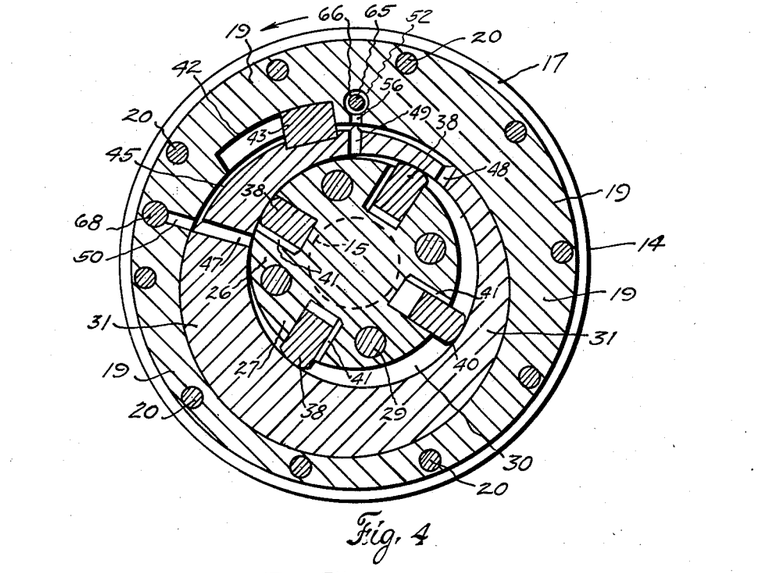
Figure 4 is a transverse sectional view taken on the line 4—4 of Figure 1.
Figure 8:
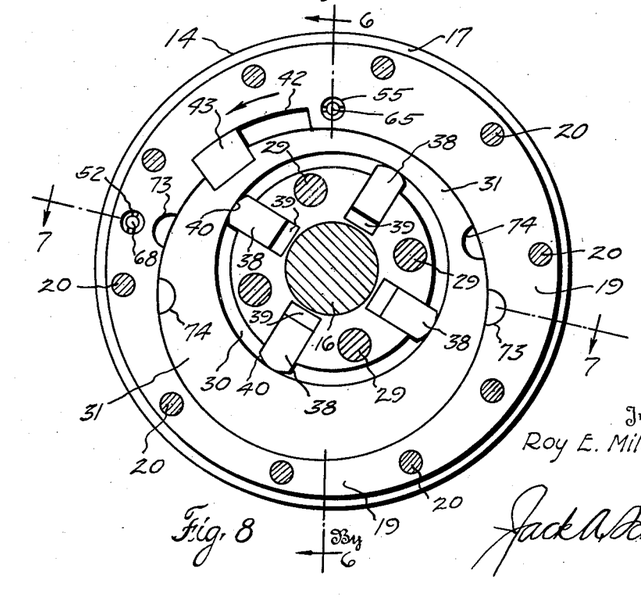
Figure 8 is a transverse sectional view taken on the line 8—8 of Figure 6.
Figure 9:
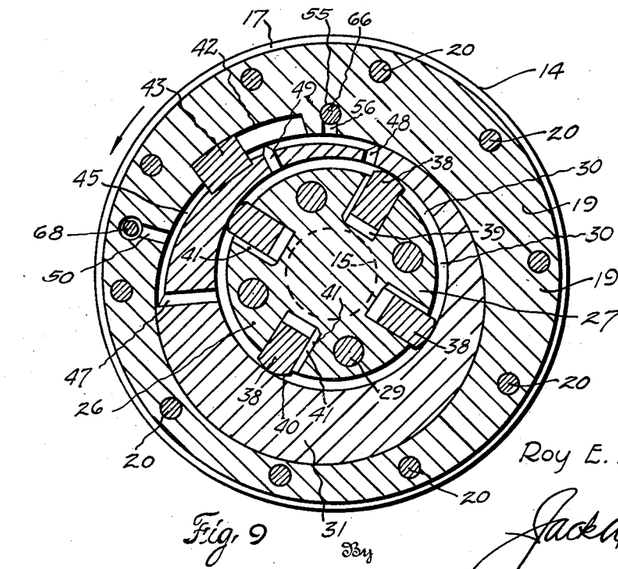
Figure 9 is a transverse sectional view taken on the line 9—9 of Figure 6.

As is shown in Figures 3, 4, 8 and 9, the ring 19 of the housing 14 has an eccentric bore in which the bushing 31 has a turning fit. The bushing has an eccentric bore which is larger in diameter than the head 27, whereby a portion of the chamber 30 lies between the periphery of the head and said eccentric bore. When the bushing is oscillated into clutching position, its bore will be in eccentric relation to the periphery of the head 27, as is shown in Figures 3 and 4; but when said bushing is adjusted to its over-running position, as is shown in Figures 8 and 9, the bore of said bushing will lie substantially concentric to the periphery of said head.

A plurality of radially movable gates 38 (see also Figures 2 and 7) are mounted transversely in pockets 39 in the head and have a sliding fit between the disks 28. Each pocket is of such depth that when its gate is resting on the bottom thereof the outer rounded end 40 of such gate will project slightly beyond the periphery of the head and engage the bore of the bushing, when said gate is fully seated in clutching position. The gates are of such radial length as to engage the bushing with their major portions remaining in the pockets at all positions.

Fluid ducts 41 in one radial side of each pocket are formed in the head and extend from the bottom of the pocket to the periphery of the head. Fluid, such as oil or other liquid suitable for the purpose, may pass inwardly through these ducts to displace the gates outwardly, and escape outwardly when the gates are forced inwardly. When the fluid is trapped between the gates and the gates are in contact with the bore of the bushing, said gates will be locked in position.

The rounded ends 40 of the gates are such as to provide substantially a transverse line of contact with the bore of the bushing and both surfaces being coated with a film of oil, very little, if any, metal to metal contacts will occur. It is obvious that when the oil is trapped between the gates in the eccentric chamber 30 between the head and the bushing, as is shown in Figures 3 and 4, said trapped oil is the clutching agent, rather than the gates, and causes the head to revolve with the bushing.

The housing ring 19 is provided with an arcuate recess 42 in the bore and a transverse key 43 seated in the bushing has a sliding fit in this recess. As is shown in Figures 2, 7, 4 and 9, the bushing 31 has a pair of arcuate ducts 45 and 46 in its outer periphery extending substantially equi-distant on each side of said key, which extends across said ducts. After the initial supply of oil to the clutch, in the manner hereinafter explained, and in the operation of the clutch, the duct 45 acts primarily as an inlet duct, while the duct 46 acts as an outlet, or relief, duct to permit over-running of the clutch. Ports 47 extend radially through the bushing from one end of each duct, while ports 48 extend radially through said bushing from the opposite end of each duct. Between the port 48 of each duct and the key, and nearer the latter, a third radial port 49 is provided.

Figure 2:
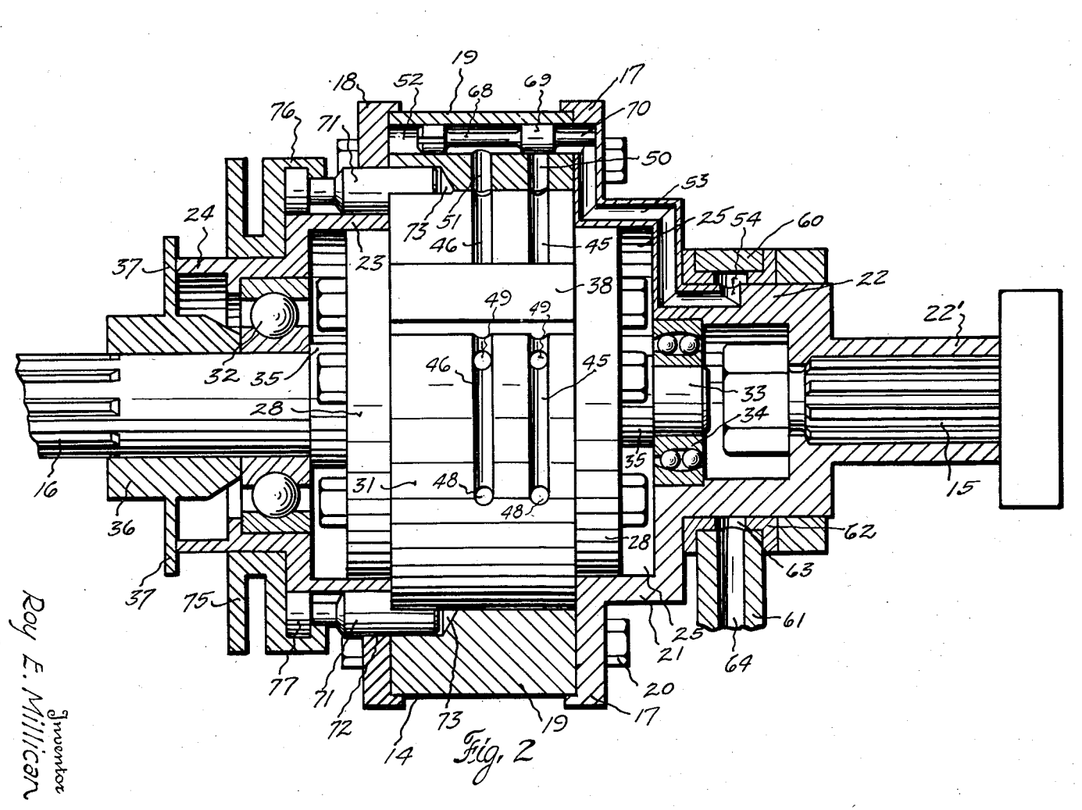
Figure 2 is a similar view taken on the line 2—2 of Figure 3, the bushing being partly in section and partly in elevation.
Figure 7:
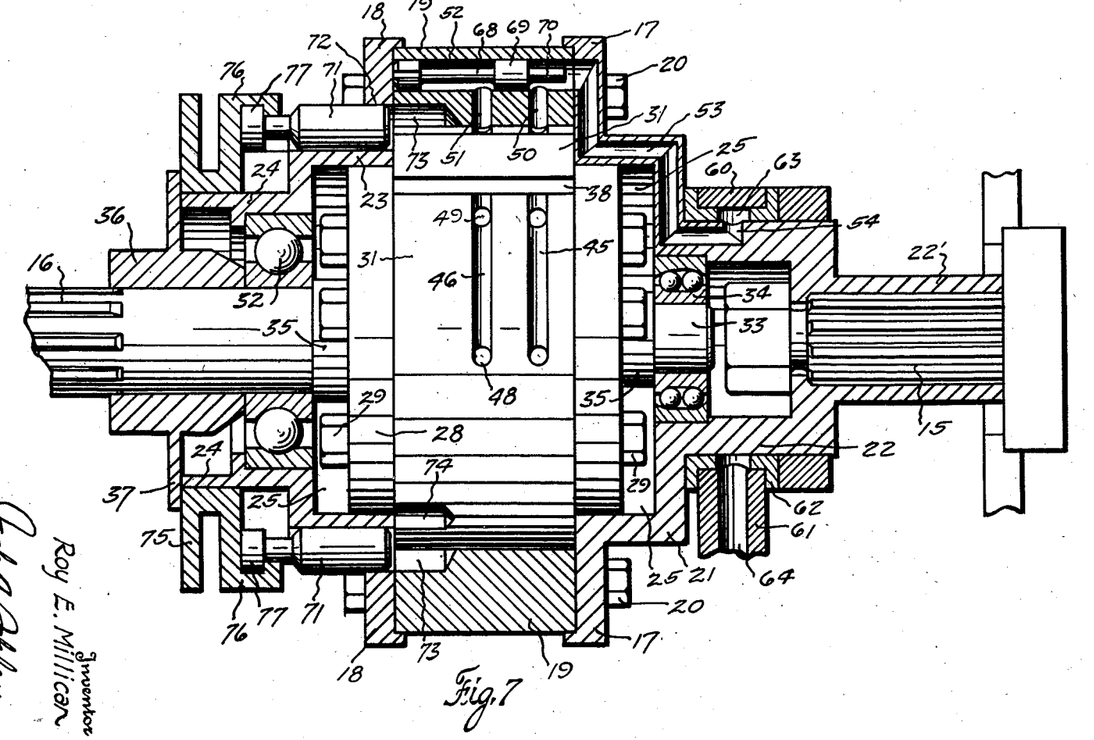
Figure 7 is a similar view taken on the line 7—7 of Figure 8.

By observing Figure 4, it will be seen that one of the gates 38 contacts the bushing 31 between the ports 47 and 49 and another gate contacts said bushing between the ports 48 and 49 and oil is thus trapped, the key 43 preventing by-passing along the ducts. When the key is in engagement with the right hand end (Figure 3) of the recess 42, the ports 47 and the ducts will register with ports 50 and 51 (Figures 2, 4 and 7) in the bore of the ring 19. These ports connect with a transverse cylindrical valve chamber 52 which connects at one end with a fluid passage 53 extending through the plate 17 and cap 21 into the hub 22, as is shown in Figures 2 and 7, to a port 54. The port 50 connects with the duct 45, while the port 51 connects with the duct 46.

From a transverse cylindrical valve chamber 55 in the ring 19, shown at about seventy degrees from the chamber 52 (Figures 3, 4, 8 and 9), the distance being variable and depending upon the clutch construction, a port 56 extends to the duct 45 and a port 57 extends to the duct 46, as shown in Figures 1, 4, 6 and 9. A fluid passage 58 extends from one end of the chamber 55 through the plate 17, cap 21 and hub 22 to a port 59. A collar 60 fastened on a standard 61 carries a split bearing ring 62 which forms an annular duct 63 from which the ports 54 and 59 extend. The standard has a fluid passage 64 and fluid, such as oil, is supplied under pressure to this passage. By this means oil is supplied to the passages 53 and 58.

When the housing 14 is revolved by the drive shaft 15 in a counter-clockwise direction (Figures 3 and 4), the ring 19 and its recess 42 will be likewise revolved with respect to the bushing 31 and the key 43; whereby said key will be held at the right hand end (Figures 3 and 4) of said recess, and said bushing will be moved into its eccentric position with respect to the head 26, as is shown in Figures 1, 2, 3 and 4. A piston valve 65 is slidable in the chamber 55 and has a head 66 of such length as to stand between the ports 56 and 57, when it is slid to open position whereby one end strikes the plate 18 at the left hand end of the chamber, as is shown in Figure 1. In this position fluid enters the port 56, but cannot enter the port 57 from said chamber. The fluid, such as oil, flows into the duct 45 and thence through the ports 48 and 49 into the chamber 30. The oil cannot pass the key 43 and is trapped in the chamber between the gates thereof. The motion which has been transmitted to the bushing 31 will be contributed through the medium of the trapped oil to the head 27, which will be caused to revolve, thus revolving the driven shaft 16 in the same direction as the drive shaft 15.

Oil in the chamber 30 is free to pass through the companion ports 48 and 49 to the duct 46 and escape through the port 57 to the chamber 55, but it will thus equalize the pressure on both sides of the head 66, thereby holding the valve 65 in place. Oil from the chamber will be displaced through the ports 47 to the ducts 45 and 46 from which it may pass through the ports 50 and 51.

In the chamber 52 (Figure 2) of the ring 19 is mounted a piston valve 68 similar to the valve 65 and having a head 69. When oil is displaced into the chamber 52 by the rotation of the bushing about the head, in establishing clutching, such oil will tend to discharge into the passage 53. Consequently the oil discharging from the port 51 will engage the head 69 and slide the valve 68 to the right (Figure 2), whereby its head 69 will cover the port 50 and prevent the escape of oil. A stem 70 on the valve will strike the plate 17 and arrest the valve in correct position.

Should the R. P. M. of the driven shaft 16 exceed that of the drive shaft 15, then the head 27 will begin to advance and move the bushing in the direction of rotation ahead of the driving housing 14. This will move the key 43 to the left (Figures 8 and 9) of the recess 42, whereby the bore of the bushing will be adjusted into concentric relation to the head and the chamber 30 will become concentric instead of eccentric. The gates 38 will each be moved to an equal projection from the head because of the concentric position, and the release of the trapped oil.

Figure 6:
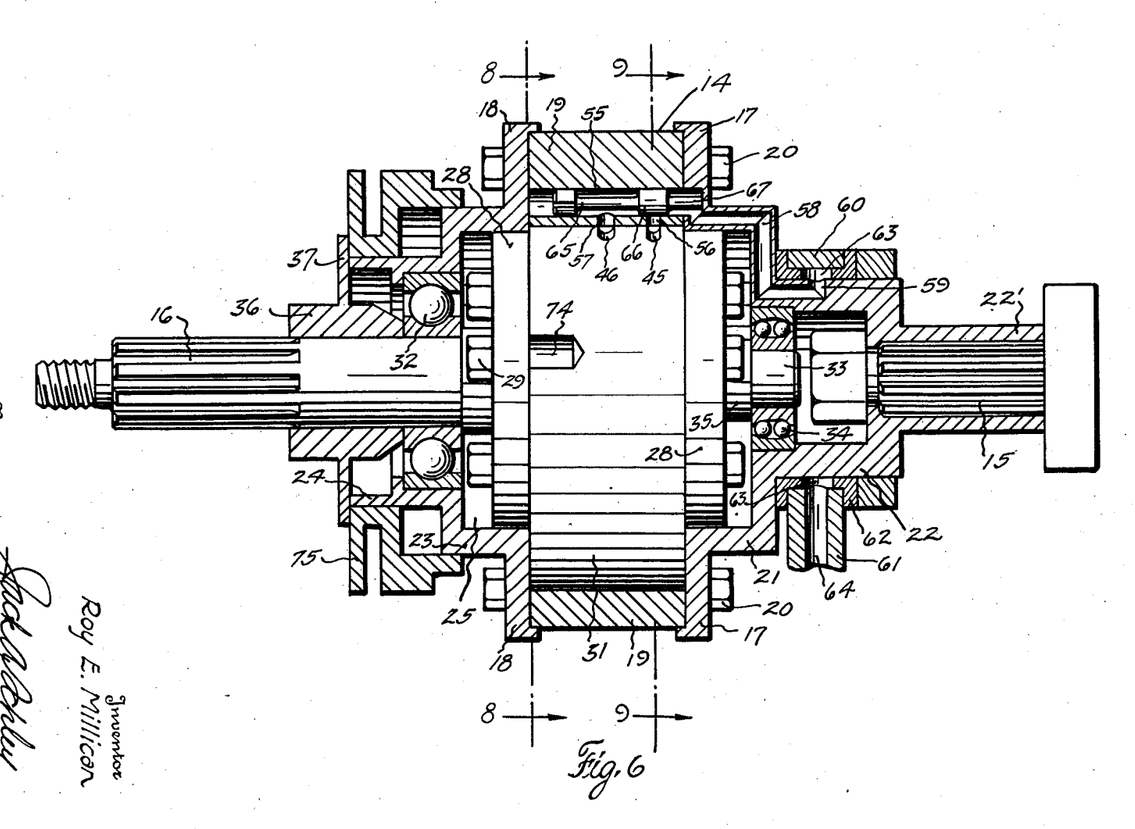
Figure 6 is a longitudinal sectional view taken on the line 6—6 of Figure 8, the bushing being in elevation and the parts in over-running position.

During the shifting of the bushing 31 to its over-running or unclutched position, as is shown in Figures 6 to 9, inclusive, there will be an immediate shifting of the valves 65 and 68, whereby they will be moved to opposite positions, as is shown in Figures 6 and 7. A stem 67 on the end of the valve 65 will engage the plate 17 and arrest the head 66 over the port 56, which will prevent oil flowing into the ports 56 and 57 from the passage 58. It is obvious that the gates 38 constantly passing the ports 48 and 49 prior to the shifting of the bushing to its over-running position will expel the oil therethrough at a greater pressure than that at which it is flowing through the passage 53 to the valve of the chamber 52. The valve 68 will, therefore, be shifted to the left (Figure 7), thus opening the port 50 which will permit oil to flow into the duct 45 and thence to the chamber 30 through the correlated port 47. Oil in the chamber 30 will be carried therearound by the gates, so long as the over-running or unlatched position is maintained.

Under some conditions it is desirable to lock the housing 14 and the bushing 31 in clutching position so as to entirely eliminate over-running. For this purpose, I provide diametrically opposite cylindrical locking pins 71 which are slidable through apertures 72 in the plate 18. Semi-circular grooves 73 (Figures 7 and 8) in the bore of the housing ring 19 are provided to register with similar grooves 74 in the outer periphery of the bushing 31 when the latter is in its eccentric position, as is shown in Figure 3. When the grooves register they form cylindrical sockets for receiving the pins 71, whereby the bushing and housing are locked together. For sliding the pins, I provide a grooved collar 75 slidable on the hub 24 of the housing plate 18, as is shown in Figures 1, 2, 6 and 7. The collar is provided with diametrically opposite hooks 76 which engage over heads 77 on the ends of the pins. Any suitable device may be introduced into the groove of the collar for sliding the same. When the collar is slid outwardly against the stop 37, as is shown in Figures 6 and 7, the pins will be withdrawn and the clutch will be free for over-running, but when the collar is slid inwardly, as is shown in Figures 1 and 2, the pins will be moved inwardly into locking position. Under ordinary running conditions the pins are withdrawn, as is shown in Figures 6 and 7.

The operation is as follows. A suitable hydraulic fluid, such as oil, is forced up through the passage 64 of the standard 61 by any suitable means, such as a pump (not shown). The oil flows into the duct 63 within the collar 60 and thence through the ports 54 and 59 to the passages 53 and 58, as will be clear from an observation of Figures 1, 2, 5, 6 and 7. The oil will thus flow through the various ports and ducts and it will be assumed that all of the hydraulic fluid passages and openings are filled with oil. Normally the clutch will be in clutching position, as is shown in Figures 1, 2, 3 and 4. In such position the bore of the bushing 31 will be eccentric to the head 26 and the key 43 will be at the right hand end of the recess 42, as is shown in Figures 3 and 4. The valve 65 will have been driven inward by the pressure of the oil flowing through the passage 58 and will uncover the port 56 so that oil may pass into the duct 45 and through its ports 48 and 49 into the chamber 30. Its passage along the duct 45 will be blocked by the key 43. This inflowing oil will pass from the chamber 30 inward in the ducts 41 to the bottoms of the pockets 39 of the two right hand gates 38, as is shown in Figure 4. The pressure of the oil will force these gates outwardly, thereby trapping oil in said chamber. Oil will also be trapped between the two bottom gates of Figure 4 and thus set up clutching relation between the bushing and the head. It is pointed out that the pressure which forces the vanes to the surface, or inner periphery of the housing, is the pressure from the intake side of the clutch which is being supplied with fluid under pressure. Therefore, the pressure created between the vanes from the driving action has no bearing on positioning the vanes, and thus, although I have shown the grooves 41 on one side of the vanes, it is obvious that the clutch will operate just as efficiently with the grooves on either side.

When the clutching action is established, the tendency will be for the bushing to rotate in a counter-clockwise direction on the head 26 (Figure 4) and any such relative movement will force oil trapped between the lower left hand gate and the ports 47 outwardly through said ports to the ducts 45 and 46. This oil will flow through the ports 50 and 51 and immediately shift the valve 68 so as to close the port 50 and cut off further escape of oil, whereby any further relative movement of the bushing around the head would be stopped. When motion is applied to the housing 14 it will either be moved to the position which has been described, or it will immediately cause the transmission of motion from the housing to the head through the hydraulic action.

Should the R. P. M. of the driven shaft 16, which is attached to the head 26, exceed the R. P. M. of the housing, said head will immediately begin to revolve faster than said housing, as will be obvious. The advance movement of the head will be in the same direction as that of the housing, and, therefore, the bushing 31 will be moved from the position shown in Figures 3 and 4 to the position shown in Figures 8 and 9. When the bushing is moved the key 43 will be partially rotated to the left in the recess 42 and this will limit the rotation of said housing. When this occurs, the bore of the bushing will be concentric to the head, as is shown in Figures 8 and 9 and the gates 38 will immediately re-adjust themselves to an equal projection from said head, whereby that portion of the channel lying between the head and the bushing will be annular, thus not obstructing a free and independent rotation of said head.

In order to maintain this relation, it is desirable to cut off the flow of oil through the passage 58 and it will be obvious, by observing Figures 4 and 9, that when the bushing is shifted from clutching to unclutching position, oil will be expelled through the ports 48 and 49 toward the passage 58 and, therefore, the oil discharging into the chamber 55 through the port 57 will slide the valve 65 and force its head 66 over the port 56, thus cutting off communication between the passage 58 and the interior of the clutch. This valve will be shifted from its position shown in Figure 1 to its position shown in Figure 6.

Again observing Figures 4 and 9, it will be apparent that when the bushing is shifted to over-running position, the oil pressure from within the clutch will be relieved and the pressure of the oil flowing from the passage 53 will shift the head 69 of the valve 68 from the position shown in Figure 2 to the position shown in Figure 7. The tendency of the oil now will be to flow into the clutch rather than out of it, as there will be no back pressure in the clutch to resist the movement of oil from passage 53 through port 50 to duct 45, thence through port 47 to chamber 30. It is obvious that as soon as the R. P. M. of the housing equals that of the head and then exceeds it, the housing will advance in a counter-clockwise direction from the position shown in Figure 9 to the position shown in Figure 4 and rotate the bushing 31 into its eccentric or clutching position. The valves will again be shifted to their clutching position shown in Figures 1 and 2.

The operation will be quick and responsive and there will be very little chance for slippage after clutching relation of connection is once set up. While I have shown and described the valves 65 and 68 as actuated by the pressure fluid, they may be actuated in any suitable manner. The important feature of the invention is the shifting of the bushing 31 from an eccentric to a concentric position. The clutch has comparatively few parts and because of the pressure of oil and its manner of circulation all parts are well lubricated and there should be a minimum of wear.

The description which has been given recites more or less detail of a particular embodiment of the invention, which is set forth as new and useful, however, I desire it understood that the invention is not limited to such exact details of construction, because it is manifest that changes and modifications may be made, within the scope of the appended claims, without departing from the spirit of the invention.

What I claim and desire to secure by Letters Patent, is:

1. A clutch comprising, a revoluble housing having fluid supply passages therethrough, a head revoluble in the housing, hydraulically actuated means movably mounted between the head and the bore of the housing for transmitting motion from one to the other, and automatically actuated means for interrupting the flow of fluid through the fluid passages of the housing for establishing driving and over-running of the clutch.

2. A clutch comprising, a revoluble housing having fluid supply passages therethrough, a head revoluble in the housing, hydraulically actuated means movably mounted between the head and the bore of the housing for transmitting motion from one to the other, and means arranged to be automatically actuated by variations in the relative speeds of the housing and head to interrupt the flow of fluid through the fluid passages of the housing for establishing driving and over-running of the clutch.

3. A hydraulic clutch comprising, a rotatable housing, a head rotatable in the housing, a movable clutching element between the head and the housing for contributing motion from one to the other, said clutching element being automatically shifted by independent rotations of the head and housing, means for trapping a hydraulic fluid between the head and the movable clutching element when said element is shifted to one position to transmit motion from the housing to the head, said means being arranged to release the trapped fluid when said clutching element is moved to another position to free said element for over-running said head, and means automatically actuated by the fluid for controlling the flow thereof, whereby said fluid is trapped and released.

4. A clutch comprising, a revoluble housing having fluid passages therethrough connected with a source of pressure fluid supply, a head revoluble in the housing, hydraulically actuated means movably mounted between the head and the bore of the housing for transmitting motion from one to the other, and valve means automatically shifted upon independent revolution of either the head or the housing for cutting off the supply of fluid through one passage and establishing it through another passage of said housing, whereby either clutching action or over-running of the clutch is established.

5. A clutch comprising, a revoluble housing having fluid passages therethrough connected with a source of pressure fluid supply, a head revoluble in the housing, hydraulically actuated means movably mounted between the head and the bore of the housing for transmitting motion from one to the other, valve means automatically shifted upon independent revolution of either the head or the housing for cutting off the supply of fluid through one passage and establishing it through another passage of said housing, whereby either clutching action or over-running of the clutch is established, and means for locking the parts in clutching relation and against over-running.

6. A clutch comprising, a revoluble housing having fluid passages therethrough connected with a source of pressure fluid supply, an oscillatory element mounted in the bore of the housing, a head mounted in and rotatable independently of said element, means for establishing hydraulic clutching relation between the head and said element, a connection between the housing and said element for limiting the independent oscillation of said element and for transmitting motion from the housing to said element, and automatic means for controlling the flow of hydraulic fluid to establish either a clutching or over-running position of the clutch.

7. A clutch including, a revoluble housing having fluid passages therethrough connected with a source of pressure fluid supply, a head revoluble in the housing, an oscillatory element disposed in the housing between the head and the bore of the housing, means for establishing hydraulic clutching relation between the head and said element, a connection between the housing and said element for limiting the independent oscillation of said element and for transmitting motion from one to the other, and means for controlling the flow of hydraulic fluid automatically operated by the fluid upon oscillation of said element to establish either a clutching or an over-running relation of the clutch elements.

8. A clutch including, a revoluble housing having fluid passages therethrough connected with a source of pressure fluid supply, a head revoluble in the housing, an oscillatory element disposed in the housing between the head and the bore of the housing, means for establishing hydraulic clutching relation between the head and said element, a connection between the housing and said element for limiting the independent oscillation of said element and for transmitting motion from one to the other, means for controlling the flow of the hydraulic fluid arranged upon oscillation of said element to automatically operate to establish either a clutching or an over-running relation of the clutch elements, and means for locking the parts in clutching relation and against over-running.

9. A clutch comprising, a revoluble housing having fluid passages therethrough connected with a source of pressure fluid supply, a head revoluble in said housing, a bushing revoluble in the housing around the head, means for establishing hydraulic clutching relation between the head and the bushing, means for connecting the bushing and housing for revolution one by the other arranged to permit a limited oscillatory movement between said housing and bushing, the bushing having fluid passages therethrough connected with the fluid passages of the housing, and means automatically actuated upon oscillation of said bushing for controlling the flow of fluid through said passages and thereby controlling the clutching action.

10. A clutch comprising, a revoluble housing having fluid passages therethrough connected with a source of pressure fluid supply, a head revoluble in said housing, a bushing revoluble in the housing around the head, means for establishing hydraulic clutching relation between the head and the bushing, means for connecting the bushing and housing for revolution one by the other arranged to permit a limited oscillatory movement between said housing and bushing, the bushing having fluid passages therethrough connected with the fluid passages of the housing, and means arranged to be automatically actuated by the hydraulic fluid upon oscillation of said bushing for controlling the flow of fluid through said passages and thereby controlling the clutching action.

11. A clutch comprising, a revoluble housing having fluid passages therethrough connected with a source of pressure fluid supply, a head revoluble in said housing, a bushing revoluble in the housing around the head, means for establishing hydraulic clutching relation between the head and the bushing, means for connecting the bushing and housing for revolution one by the other arranged to permit a limited oscillatory movement between said housing and bushing, the bushing having fluid passages therethrough connected with the fluid passages of the housing, means automatically actuated upon oscillation of said bushing for controlling the flow of fluid through said passages and thereby controlling the clutching action, and means for locking the housing and bushing in clutching relation and against over-running.

12. A clutch comprising, a revoluble housing having fluid passages therethrough connected with a source of pressure fluid supply, a head revoluble in said housing, a bushing eccentrically mounted and revoluble in the housing around the head, gates movable in the head by the hydraulic fluid and engaging the bore of the bushing for trapping the fluid therebetween, means for connecting the bushing and housing for revolution one by the other arranged to permit a limited oscillatory movement between said housing and bushing to establish a clutched or unclutched relation between the head and bushing, the bushing having fluid passages therethrough connected with the fluid passages of the housing, and means automatically actuated upon oscillation of said bushing for controlling the flow of fluid through said passages and thereby controlling the clutching action.

13. A clutch comprising, a revoluble housing having fluid passages therethrough connected with a source of pressure fluid supply, a head revoluble in said housing, a bushing eccentrically mounted and revoluble in the housing around the head, gates movable in the head by the hydraulic fluid and engaging the bore of the bushing for trapping the fluid therebetween, means for connecting the bushing and housing for revolution one by the other arranged to permit a limited oscillatory movement between said housing and bushing to establish a clutched or unclutched relation between the head and the bushing, the bushing having fluid passages therethrough connected with the fluid passages of the housing, and means arranged to be automatically actuated by the hydraulic fluid upon oscillation of said bushing for controlling the flow of fluid through said passages and thereby controlling the clutching action.

14. A clutch comprising, a revoluble housing having fluid passages therethrough connected with a source of pressure fluid supply, a head revoluble in said housing, a bushing eccentrically mounted and revoluble in the housing around the head, gates movable in the head by the hydraulic fluid and engaging the bore of the bushing for trapping the fluid therebetween, means for connecting the bushing and housing for revolution one by the other arranged to permit a limited oscillatory movement between said housing and bushing to establish a clutched or unclutched relation between the head and the bushing, the bushing having fluid passages therethrough connected with the fluid passages of the housing, means automatically actuated upon oscillation of said bushing for controlling the flow of fluid through said passages and thereby controlling the clutching action, and means for locking the housing and bushing in clutching relation and against over-running.

15. A clutch comprising, a revoluble housing having fluid passages therethrough connected with a source of pressure fluid supply, a head revoluble in the housing, the housing having an eccentric bore, a bushing rotatable in the bore of the housing and having an eccentric bore surrounding the head, hydraulic gates movably mounted in the head and engaging the bore of the bushing, means for transmitting motion between the housing and the bushing and arranged to permit an oscillation of the bushing, whereby its bore may be moved into eccentric clutching or concentric unclutching relation to the head, the bushing having fluid passages therethrough connected with the passages of the housing, and means for controlling the flow of the fluid automatically actuated upon oscillation of the bushing.

16. A clutch comprising, a revoluble housing having fluid passages therethrough connected with a source of fluid supply, said housing having an eccentric bore, a head revoluble in the eccentric bore of the housing, a bushing rotatable in the bore of the housing and having an eccentric bore surrounding the head, hydraulic gates movably mounted in the head and engaging the bore, a key carried by the bushing and engaging in the housing for transmitting motion from one to the other and having a limited movement in the housing, whereby said bushing may be oscillated to move its bore into eccentric relation or concentric relation to the head, the bushing having fluid passages therethrough connected with the passages of the housing, and valve means for controlling the flow of the fluid arranged to be automatically actuated upon oscillation of said bushing.

17. A clutch comprising, a revoluble housing having fluid passages therethrough connected with a source of pressure fluid supply, a head revoluble in the housing, the housing having an eccentric bore, a bushing rotatable in the bore of the housing and having an eccentric bore surrounding the head, the bushing having arcuate ducts communicating with the passages of the housing and also provided with ports extending to its eccentric bore, means for transmitting motion between the housing and the bushing and arranged to permit an oscillation of the bushing, whereby its bore may be moved into eccentric or concentric relation to the head, and valve means for controlling the flow of fluid through the head and bushing, whereby fluid may be trapped between said gates when the bushing is moved into eccentric relation to said head.

18. A clutch comprising, a revoluble housing having fluid passages therethrough connected with a source of pressure fluid supply, a head revoluble in and of the housing, having pockets provided with fluid inlets, gates movable radially of the head in said pockets, the housing having an eccentric bore, a bushing rotatable in the bore of the housing and having an eccentric bore surrounding the head, the bushing having arcuate ducts communicating with the passages of the housing and ports extending from said ducts to its eccentric bore, a key for transmitting motion between the housing and the bushing and arranged to permit an oscillation of the bushing, whereby its bore is moved into eccentric and concentric relation to the head, the key being interposed between certain of said ports and interrupting the flow of fluid through said ducts from ports on one side of said key to ports on the other side, and valve means for controlling the flow of fluid through the housing and bushing, whereby fluid may be trapped between said gates when the bushing is moved into eccentric relation to said head.

19. A clutch comprising, a housing having fluid passages extending therethrough and connected with a source of pressure fluid supply, a head revoluble in the housing, hydraulic clutching means carried by the head, clutch connecting means movable into eccentric relation to said head for setting up hydraulic clutching connection and movable into concentric relation to said head for setting up over-running relation, and means automatically actuated upon movement of said connecting means for controlling the flow of the hydraulic fluid for clutching or over-running.

20. In a hydraulic clutch, the combination of a revoluble housing having fluid passages therethrough provided with valve chambers, valves slidable in said chambers for interrupting the flow of fluid therethrough, said housing having an eccentric bore provided with an arcuate recess, a bushing having a rotating fit in the bore of the housing and provided with arcuate ducts and ports in communication with the valve chambers of the head, a key extending across said ducts and engaging in the recess of the housing for limiting respective rotation of the housing and bushing, said key being interposed between certain of said ports and interrupting the flow of fluid through said ducts from said ports on one side of said key to ports on the other side, said bushing having an eccentric bore, a cylindrical head mounted in the bore of the bushing and having fluid pockets, and gates mounted in the pockets of said head and engaging the bore of the bushing for trapping fluid therebetween.

21. A hydraulic clutch comprising, a rotatable housing, a head rotatable in the housing, a movable clutching element interposed between the head and the housing, and adapted to be automatically shifted by independent rotations of the head and housing, means for trapping a hydraulic fluid between the head and said clutching element when the latter is shifted to one position, whereby to transmit motion from the housing to the head, said means being adapted to release the trapped fluid when the clutching element is moved to another position to permit independent rotation of the head relative to said clutching element, and means automatically actuated by the fluid in the operation of the clutch for controlling the flow of the fluid to and from the clutch dependent upon the position of said clutching element.

22. A clutch comprising, a revoluble housing having fluid passages therethrough connected with a source of pressure fluid supply, an oscillatory element mounted in the bore of the housing, a head mounted in and rotatable independently of said element, means for establishing hydraulic clutching relation between the head and said element, a connection between the housing and said element for limiting the independent oscillation of said element and for transmitting motion from the housing to said element, means for controlling the flow of the hydraulic fluid automatically operated upon oscillation of said element to establish either a clutching or over-running position of the clutch, and means for locking the parts at will in clutching relation and against over-running.

23. A hydraulic clutch comprising, a positively driven rotatable housing, a head rotatable in the housing, a movable clutching element interposed between the head and the housing and shiftable by the housing to a clutching position, and by rotation of the head at a speed greater than that of the housing, to an unclutched position, means for trapping a hydraulic fluid between the head and the clutching element when the latter is shifted to a clutching position, whereby to transmit motion from the housing to the head, means for releasing the trapped fluid when the clutching element is moved by the head to the unclutched position, and means automatically actuated by the fluid in the operation of the clutch for controlling the flow of the fluid into and out of the clutch, dependent upon the position of said clutching element.

24. A clutch comprising, a revoluble housing having fluid passages, a head revoluble in the housing, a member movably mounted between the head and the bore of the housing for transmitting motion to the head from the housing, and means automatically actuated by the fluid for effecting a fluid lock between the head and said member, the latter being movable by the head to release the lock when the speed of rotation of the head exceeds that of the housing.

25. A clutch comprising, a revoluble housing provided with controllable pressure fluid passages, a bushing mounted to oscillate in said bore, and cooperating in the control of said passages, means for rotating said bushing with respect to the housing, a head revolubly mounted in the bore of said bushing, and means automatically actuated by the fluid for effecting a fluid lock between the head and the bushing, said fluid lock operating to oscillate said bushing and thereby effect release of the fluid lock when the speed of rotation of the head exceeds that of the housing.

26. A clutch comprising, a revoluble housing provided with pressure fluid passages and having an eccentric bore, a bushing mounted to oscillate in said bore, means for rotating said bushing with respect to the housing, a head revolubly mounted in the bore of said bushing, means automatically actuated by the fluid for effecting a fluid lock between the head and the bushing, and means for oscillating said bushing to effect an automatic release of said fluid lock when the speed of rotation of the head exceeds that of the housing.

27. A clutch comprising, a housing having spaced valve chambers provided with supply-fluid inlets, said housing having ports extending from each valve chamber to its bore, shiftable valves mounted in said chambers, an annular clutching element movable in the housing, said clutching element having a pair of fluid passages registering with the ports of the housing, and also having ports leading from its passages to its bore, and a head revoluble in the clutching element and having means coacting with said element for trapping fluid in the bore of said element, said movable clutching element being shiftable from clutching position to over-running position, whereby fluid is displaced through said ports and passages to shift said valves and maintain such positions.

28. A clutch comprising, a revoluble housing having fluid passages and valve chambers connected with said passages, a head revoluble in the housing, a member movably mounted and surrounding the head in the bore of the housing for transmitting motion to the head from the housing, said member having fluid passages registering with the fluid passages of the housing and ports extending from its fluid passages to its bore, and alternately shiftable valves in the chambers of the housing automatically actuated by the fluid for effecting a fluid lock between the head and said member, said member being movable by the head to release the lock when speed of rotation of the head exceeds that of the housing and whereby the fluid is displaced through said passages and ports to shift said valves and maintain such position.

29. A clutch comprising, a revoluble housing having fluid passages and valve chambers connected therewith, movable clutching members within the housing having fluid passages and means for forming fluid locks, the fluid passages of the housing being in constant communication with the fluid passages of the clutching members, and valves in the housing chambers, said valves being shiftable by the fluid to effect a fluid lock between the clutching members to establish clutching and shiftable by the fluid when said members establish unclutching to release said fluid lock.

30. A clutch comprising, a revoluble housing having a pair of valve chambers, each having a supply-fluid inlet, a movable annular clutch member in the housing having a fluid supply passage and a fluid relief passage, each connected with the bore of said member, each valve chamber of the housing having a port in constant communication with the fluid passage of said clutch member and a port in constant communication with the relief passage of said member, a head revoluble in the movable clutch member having fluid locking means co-acting with said clutch member, and valves in alternate positions in said chambers for controlling the flow of fluid, one of said valves being positioned to close the relief port and to open the supply port of its chamber and the other valve being positioned to close the supply port and to open the relief port of its chamber, said valves being shiftable by the fluid to reverse their positions when the clutch elements are shifted to clutch and unclutch the head and housing.

31. A clutch comprising, a revoluble housing, a shiftable clutching member in the housing connected therewith, a head revoluble in the member and having fluid actuated means for trapping fluid to establish clutching relation with said member, the housing and member having supply-fluid conductors for fluid flowing between the head and the housing, said conductors being spaced apart at their ends which flow fluid to and from the head, and valves, one in each passage, one valve being positioned to establish the flow of fluid to one part of the head and the other valve being positioned to cut off the flow of fluid to the other part of the head, whereby fluid is trapped at that part of the head by the trapping means, said valves being shiftable by the fluid to reverse their positions when the head and member are unclutched, whereby the fluid is untrapped.

ROY E. MILLICAN.